June 2, 1970  AKIRA TOMITA  3,515,498
BLOWER

Filed Sept. 23, 1968  3 Sheets-Sheet 1

INVENTOR.
AKIRA TOMITA
BY
Scrivener Parker Scrivener & Clarke
ATTORNEYS

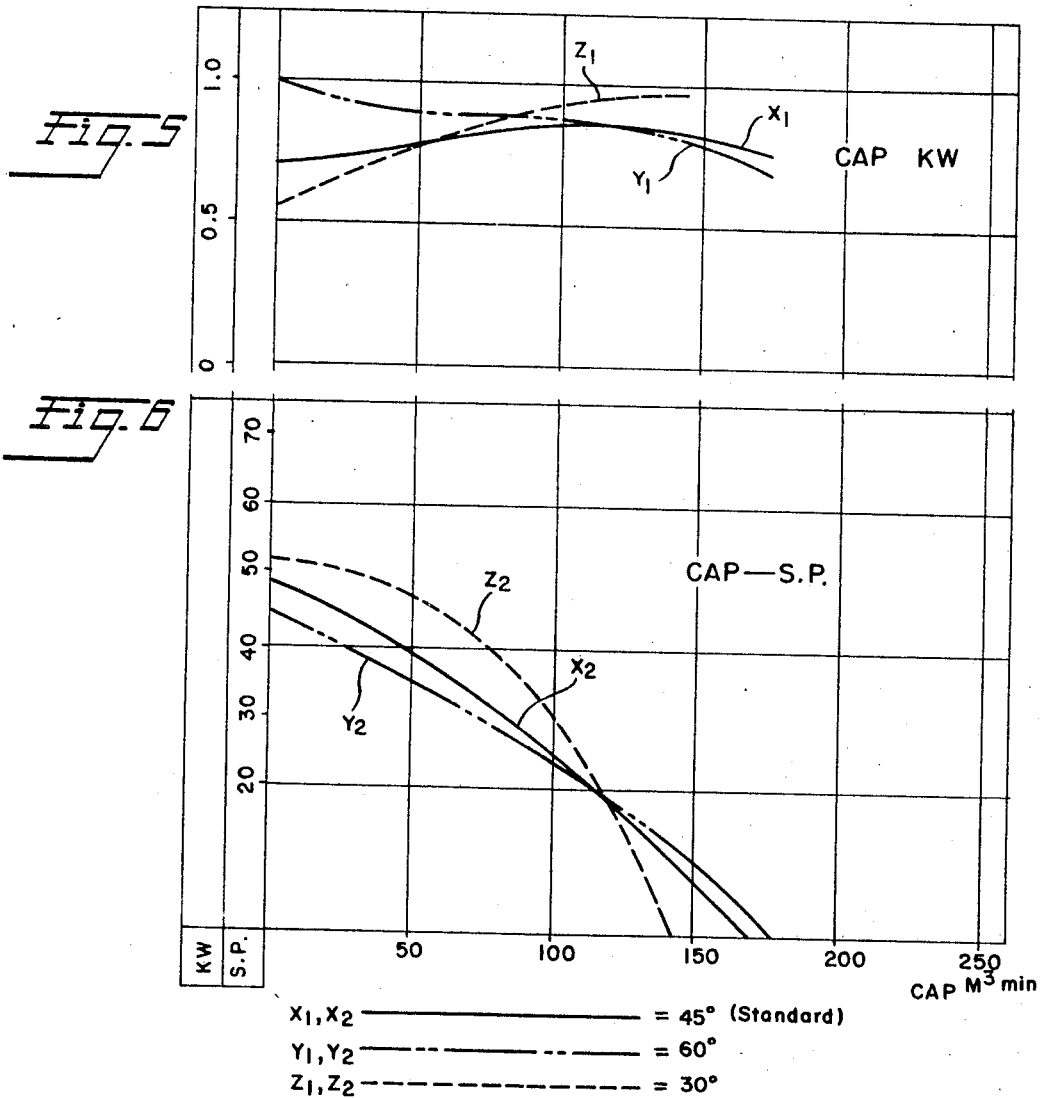
$X_1, X_2$ ——————————— = 45° (Standard)
$Y_1, Y_2$ —··—··—··— = 60°
$Z_1, Z_2$ ———————— = 30°

United States Patent Office 3,515,498
Patented June 2, 1970

3,515,498
BLOWER
Akira Tomita, Kawaguchi-shi, Saitama-ken, Japan, assignor to Asahi Dengyo Kabushiki Kaisha, Saitama-ken, Japan, a company of Japan
Filed Sept. 23, 1968, Ser. No. 761,527
Claims priority, application Japan, Oct. 28, 1967, 42/91,235
Int. Cl. F04d 19/00, 29/26, 25/26
U.S. Cl. 415—208                              3 Claims

ABSTRACT OF THE DISCLOSURE

A blower comprising an impeller means having an inner ring and an outer ring provided at an angle of 30 to 60 degrees to the line perpendicular to the center of the axis of the wind channel and a suitable number of vanes radially arranged between the said rings.

DETAILED EXPLANATION OF THE INVENTION

This invention relates to an improved blower. In the past, axial-flow blowers incorporating a propeller fan have been used for blowing air or other gas in the axial (straight) direction.

Such conventional axial flow blowers have efficiency 5 to 10% higher than centrifugal or other types of blowers and are suitable for high speed revolution. Therefore, they can be directly connected to a motor and can be made small in their overall size and light in weight. However, the circumferential velocity of the impeller means of such axial flow blowers at a given wind pressure is the fastest of all types of blowers. Especially, it is 1.5 to 2 times higher as compared with that of centrifugal blowers and therefore makes greater noise which is not desirable in operation or for the prevention of public damage. Furthermore, although the axial flow blower is suitable for low wind pressure, it produces only very small wind volume at high wind pressure and thus is not suitable for blowing air at high wind pressure.

An object of the present invention is to provide a blower which is free from the aforementioned disadvantages of the axial-flow blower and which is capable of blowing sufficient volume of wind with a minimum noise even when a high wind pressure is produced.

The blower according to this invention comprises an impeller means having an outer ring of a necessary width and diameter in the form of a cone with its top cut off provided at an angle of 30–60 degrees to the perpendicular line and an inner ring with a diameter smaller than that of the said outer ring and in the form of a cone with its top cut off and having its inner surface slanted at an angle of 30 to 60 degrees to the perpendicular line. A suitable number of vanes being radially arranged between the said two rings spaced apart with a suitable distance between them thereby forming the said impeller means and the back of the said impeller means being connected to a motor to form an integral body so that the air inhaled from the front of the said impeller means by the motor can be blown out in the axial direction, after drawing a gentle curve.

This invention is further described below in reference to the attached drawings.

Figure 1:
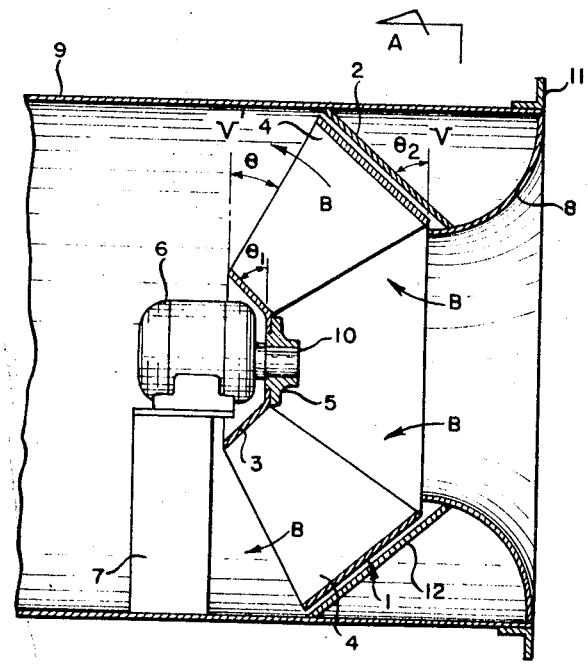
FIG. 1 is a sectional side view of a part of the blower of this invention as it is mounted in the wind channel.
Figure 2:
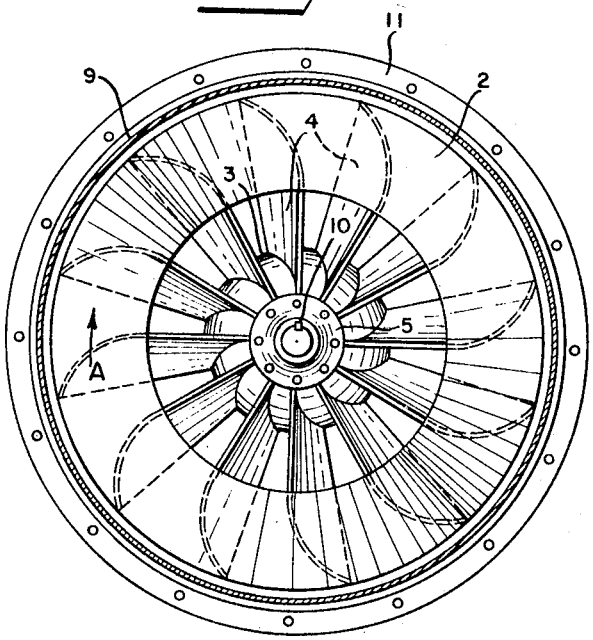
FIG. 2 is a front view of the portion of the blower indicated in FIG. 1 as viewed in the direction of the line A.

FIG. 5 describes the relationship between the wind volume and the power of the blower of this invention when the angle of the inner and outer rings to the perpendicular line is 30, 45 and 60 degrees respectively.

FIG. 6 shows the relationship between the wind volume and the pressure at the same angle of the inner and outer rings to the perpendicular line as those illustrated in FIG. 5.

The blower of the present invention comprises an impeller means 1 consisting of an outer ring 2 in the form of a cone with its top cut off having a necessary breadth and slanted at an angle $\theta_2$ of 45 degrees to the perpendicular line V, of an inner ring 3 in the form of a cone with its top cut off having smaller breadth and diameter than those of the said outer ring 3 and slanted at an angle $\theta_1$ of 45 degrees to the perpendicular line V and of a suitable number of vanes radially arranged between the said outer ring 2 and the inner ring 3 at fixed intervals and with the outer edge of each vane slanted at an angle $\theta'$ of 30 degrees to the perpendicular line V', a boss 5 being fixed to the center of the inner ring 3 of the said impeller means 1 and the end of the shaft of a motor 6 being fitted into the said boss 5 and connected thereto with a key 10 to form an integral body in such a manner that the impeller means 1 can be rotated by the motor. At a suitable place inside the wind channel 9 is provided a stand 7 of a suitable height for supporting the motor and the motor 6 is mounted on the said stand in such a direction as to cause the impeller means to face toward the direction of the flow of the wind. On the front side of the impeller means is provided a bell mouth 8 for introducing the air into the outer ring 2 so as to enable all the air to be inhaled through the said bell mouth as the impeller means 1 is rotated. In the figures, 11 is a connecting flange of the wind channel 9 and 12 is a check ring fixed between the bell mouth 8 and the wind channel 9.

When the motor 6 is started, the impeller means 1 connected to the shaft of the motor by means of the boss 5 so as to form an integral body rotates in the direction indicated by the arrow A, inhales the air existing in front of the impeller 1 inside the wind channel 9 in the direction as indicated by the arrow B and blows it out to the back side of the impeller means 1 after causing it to draw a gentle S-curve by means of the slanted vanes 4.

In the blower of this invention, the inner and outer rings 2, 3 having numerous vanes 4 are slanted at an angle of 45 degrees to the perpendicular line V so that the air is blown out, drawing a gentle S-curve after first being curved outward. Thus, the blower according to this invention incorporates all the advantages that the conventional axial-flow and centrifugal type blowers have so that there will be a minimum variation in the power when the wind volume is increased and a considerable range of changes in the wind volume can be efficiently coped without using a motor of high power. In addition, it is more suitable for high wind pressure than the axial-flow blower and is capable of producing a greater volume of wind than the centrifugal blower.

Figure 3:
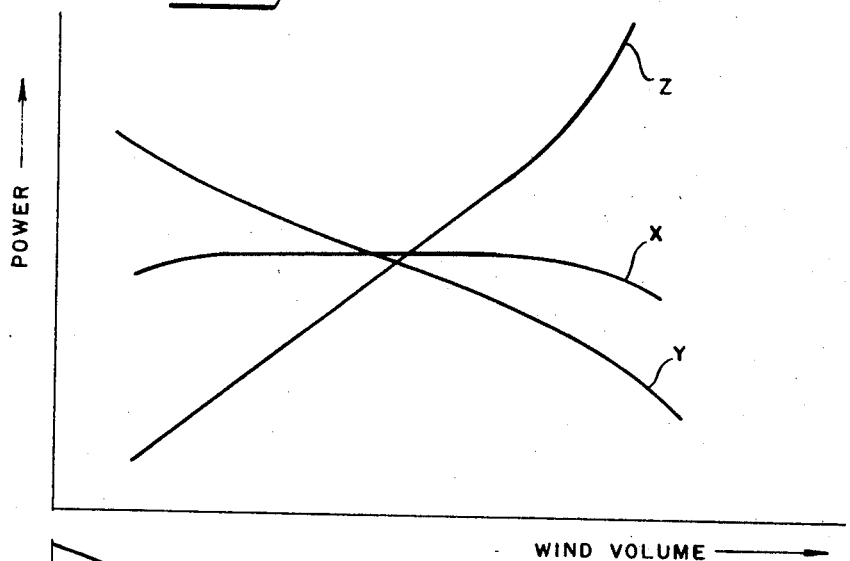
FIG. 3 shows the relationship between the wind volume and the power of the blower of this invention and those of the blowers of axial flow and centrifugal types.
Figure 4:
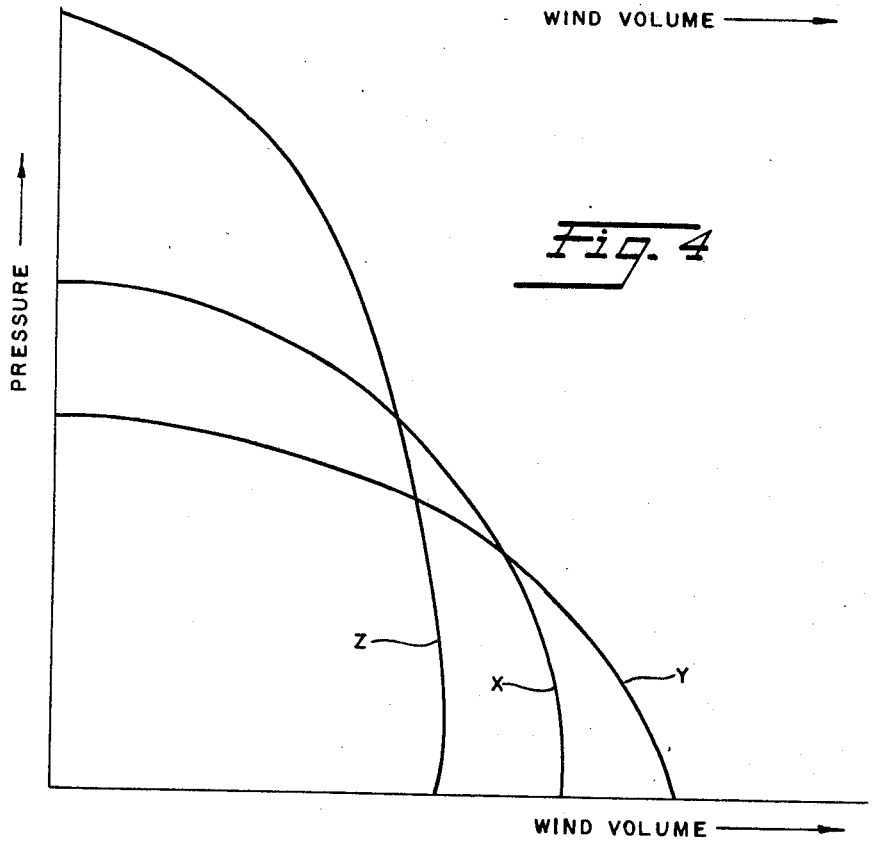
FIG. 4 shows the relationship between the wind volume and the pressure of the blower of this invention and those of the blowers of axial-flow and centrifugal types.

The conventional axial-flow and centrifugal blowers have such characteristics as are shown in FIG. 3 and FIG. 4. As can be seen in FIG. 3 where the axis of abscissa represents the wind volume, and axis of ordinate represents the power, the curve Y shows an increase of the power as the wind volume becomes smaller in the axial-flow blower and the curve Z shows an increase of power as the wind volume increases in the centrifugal blower. This means that both of those blowers require a motor with high horsepower.

Now, with reference to the relationship between the pressure and the wind volume shown in FIG. 4 in which the axis of abscissa represents the wind volume and the axis ordinate represents the pressure, the pressure gradually increases as the wind volume increases as indicated by the curve Y' in the case of the axial-flow blower, and in the case of the centrifugal blower, the pressure falls sharply as the wind volume increases as illustrated by the curve Z'. To compare these two types of the blower, the axial-flow blower is considered superior with respect to the greater volume of wind that it can produce. On the other hand, it has a disadvantage as compared with the centrifugal blower in that the capacity to produce wind sharply lowers at the high wind pressure.

As heretofore described, in the blower of this invention, the rings on both sides of the centrifugal blower are termed the outer ring and the inner ring respectively and are slanted at an angle of 45 degrees to the perpendicular line V so as to inhale the air with their numerous slanted vanes and to blow it out in the axial direction after causing it to curve. This type of the blower has an advantage that the power shows little change even if the wind volume changes as indicated by the curve X in FIG. 3 and therefore a motor with a smaller horsepower than that of the axial-flow and centrifugal blower can be utilized. Also, with respect to the relationship between the wind volume and the pressure, it has a further advantage that the wind pressure at the position where the wind volume is low is higher than that of the axial flow blower as shown by the curve X' in FIG. 4 and the decrease of the pressure is less sharp than the centrifugal blower where the wind volume is high. Especially at the oblique lined area in FIG. 4, it can be seen that the blower of this invention is superior to both the axial flow and centrifugal blowers in all respects.

In the foregoing description, the device having the outer edges of the vanes 4 slanted at an angle of 30 degrees to the perpendicular line is illustrated. However, other than the angle of 30 degrees, any angle between approximately 15 and 45 degrees may also bring about a satisfactory result. Also, in the above descriptions, the angle of the outer ring 2 and the inner ring 3 to the perpendicular line V was 45 degrees. However, the angle need not be limited to 45 degrees but any angle within the range of 30 to 60 degrees may also be usable. Likewise, it is needless to say that the angles $\theta_2$ and $\theta_1$ of the rings 2, 3 to the perpendicular line may be separately determined within the range of 30 to 60 degrees depending upon the desired wind volume and wind pressure and thus the angles $\theta_1$ and $\theta_2$ may have different values.

FIG. 5 and FIG. 6 show the capacity-power and capacity-pressure relationships when the angles $\theta_1$, $\theta_2$ is 30, 45 and 60 degrees respectively. It can be seen from the figures that the object of this invention is well accomplished at any angle in the range of 30 to 60 degrees. In FIG. 5 and FIG. 6, $X_1$ and $X_2$ represent the blower of this invention with both of its angles $\theta_1$ and $\theta_2$ set at 45 degrees. $Y_1$ and $Y_2$ represent the said blower with both of its angles set at 60 degrees and $Z_1$ and $Z_2$ represent the said blower with both of its angles $\theta_1$ and $\theta_2$ set at 30 degrees.

As disclosed in the foregoing descriptions, the blower according to the present invention comprises numerous vanes slanted at a suitable angle and provided between the inner and outer rings which are likewise slanted at a suitable angle, and as such has various advantages over the axial-flow blower and the conventional centrifugal blower in that it requires much less space for installation, makes less noise and produces much more wind at a high wind pressure than the axial flow blower, can use a motor with a smaller horsepower than that of the conventional axial-flow and centrifugal blowers and that it has a significant practical value because it can be manufactured simply and at low cost.

What is claimed is:
1. Rotary impeller means for a blower, comprising successive first and second axially spaced, colinearly arranged divergent frustoconical rings, said first ring having a greater average diameter than the second, each of said rings having an outer surface that is inclined at an angle of between 30 to 60 degrees relative to a plane normal to the impeller axis; a plurality of radially extending circumferentially spaced slanted vanes secured between said rings to form a rigid impeller unit;

and a shaft connected at one end with the inner edge portion of, and extending coaxially within, said other ring; whereby upon rotation of said impeller means by the connection of a motor with said shaft, air is initially drawn within the central inner portion of said impeller means, is caused to make a gentle S-curve during longitudinal travel through said impeller means, and is exhausted axially rearwardly from said impeller means.

2. A blower as described in the above claim 1 in which the angle of the outer edges of the vanes to the perpendicular line is determined within the range of 15 to 45 degrees.

3. Blower means, comprising
a stationary tubular housing;
annular bell mouth means the outer periphery of which is secured to one end of said housing, said bell mouth means converging inwardly within said tubular housing;
a frustoconical check ring arranged concentrically within said housing, said check ring being connected at its inner edge with the free extremity of the converging portion of said bell mouth means, said check ring diverging outwardly toward and being in engagement at its outer edge with said tubular housing; and
impeller means mounted for rotation within said housing, said impeller means including successive first and second axially spaced, colinearly arranged divergent frustoconical rings, said first impeller ring being immediately adjacent said check ring and the other of said impeller rings having an average diameter smaller than that of said first impeller ring, each of said rings having an outer surface that is inclined at an angle of between 30 to 60 degrees relative to a plane normal to the impeller axis, a plurality of radially extending circumferentially spaced slanted vanes secured between said rings to form a rigid impeller unit, and a shaft connected at one end with the inner edge portion of, and extending coaxially within, said other ring, whereby upon rotation of said impeller means by the connection of a motor with said shaft, air is initially drawn within the central inner portion of said impeller means, is caused to make a gentle S-curve during longitudinal travel through said impeller means, and is exhausted axially rearwardly from said impeller means.

References Cited
UNITED STATES PATENTS

| | | | |
|---|---|---|---|
| 420,470 | 2/1890 | Seymour | 230—120 |
| 1,614,091 | 1/1927 | Vantoff | 230—117 |
| 2,847,156 | 8/1958 | Bleier | 230—117 |

FOREIGN PATENTS

| | | |
|---|---|---|
| 717,272 | 10/1931 | France. |
| 52,347 | 9/1938 | Netherlands. |

HENRY F. RADUAZO, Primary Examiner